May 27, 1941.  G. R. MAGNEY  2,243,281
HUMIDIFIER, HEATER, AND DEHUMIDIFIER
Original Filed Oct. 27, 1930  8 Sheets-Sheet 2

Inventor:
GOTTLIEB R. MAGNEY
By Reif & Braddock
Attorneys.

May 27, 1941.  G. R. MAGNEY  2,243,281
HUMIDIFIER, HEATER, AND DEHUMIDIFIER
Original Filed Oct. 27, 1930    8 Sheets-Sheet 3

Inventor:
GOTTLIEB R. MAGNEY
By Reif & Braddock
Attorneys.

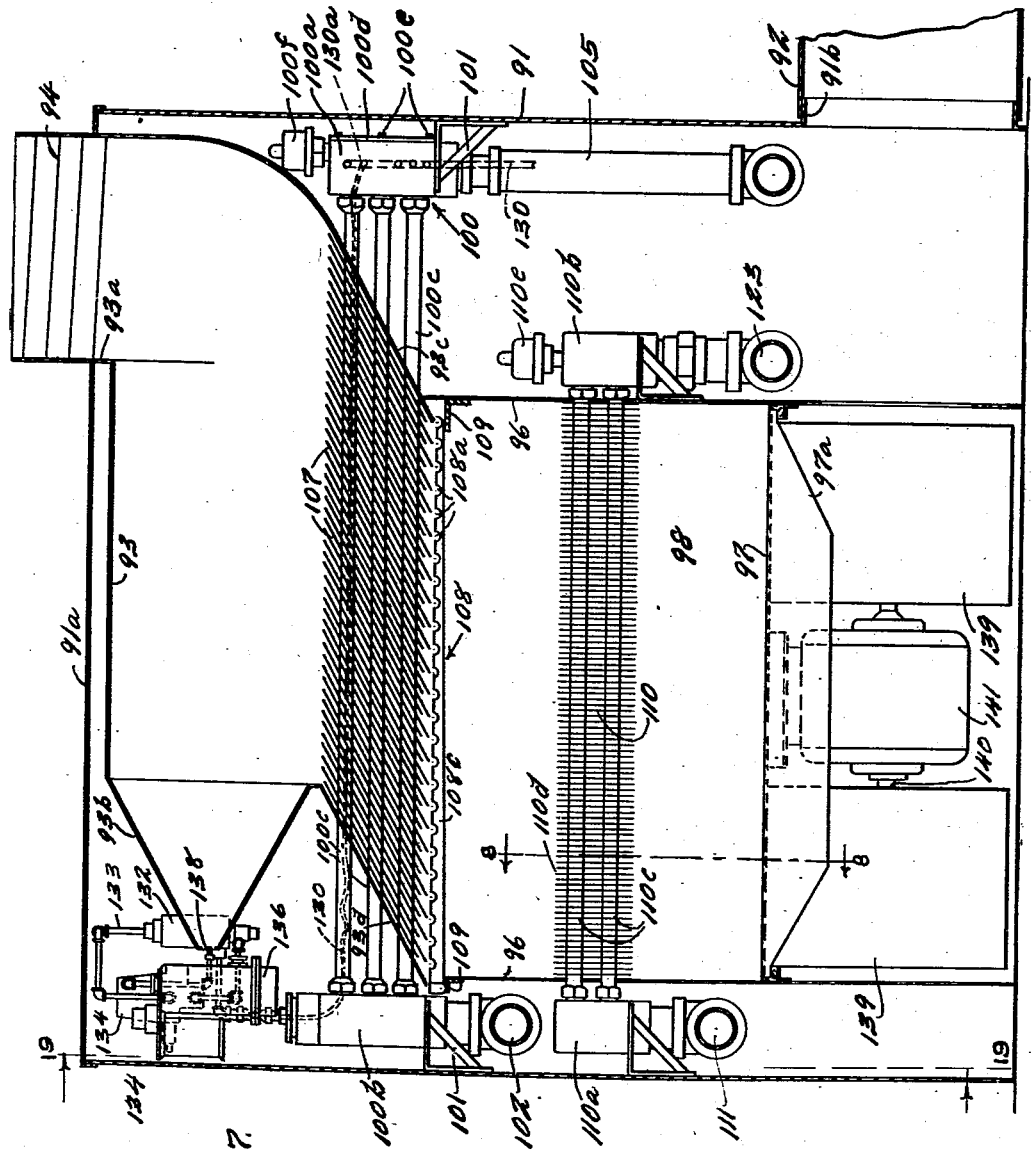

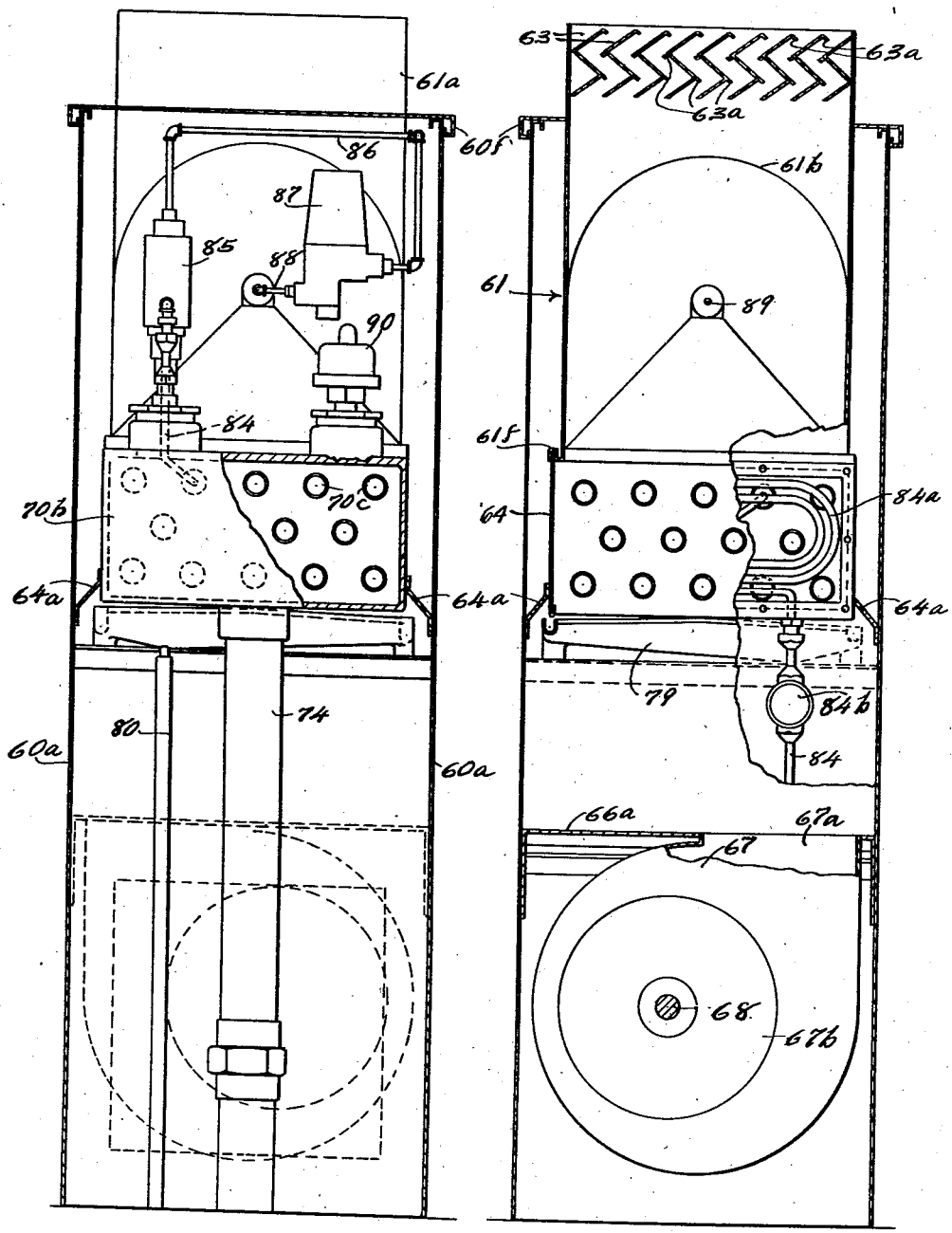

May 27, 1941.　　　　G. R. MAGNEY　　　　2,243,281
HUMIDIFIER, HEATER, AND DEHUMIDIFIER
Original Filed Oct. 27, 1930　　8 Sheets-Sheet 6
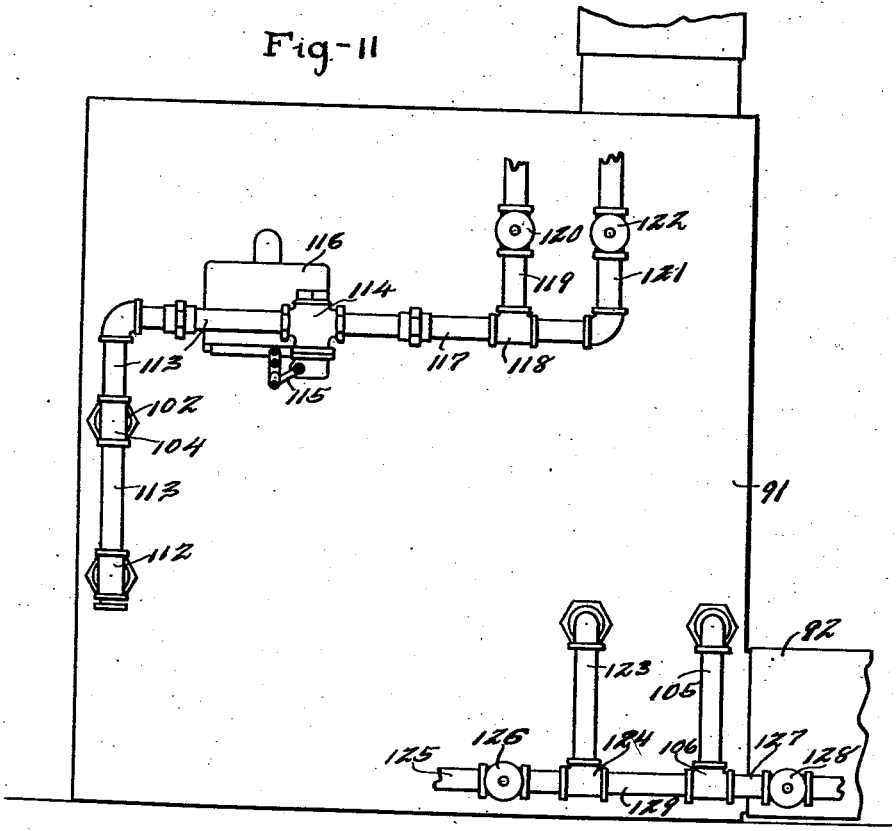
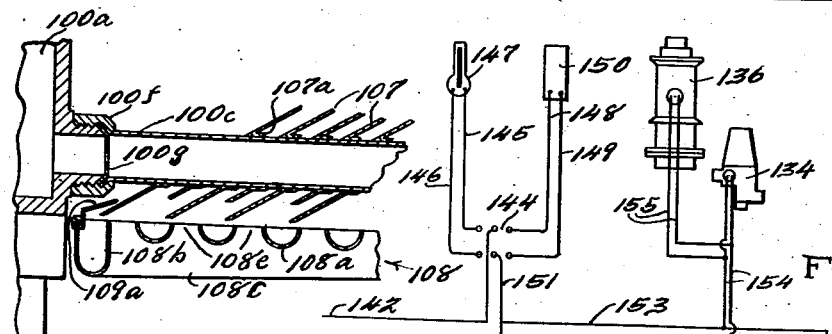
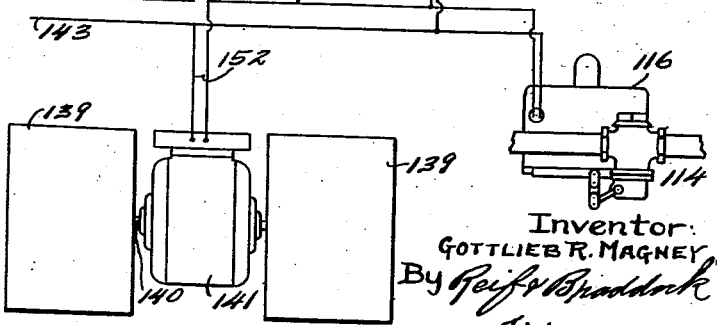
Inventor:
GOTTLIEB R. MAGNEY
By Reif & Braddock
Attorneys.

May 27, 1941.  G. R. MAGNEY  2,243,281
HUMIDIFIER, HEATER, AND DEHUMIDIFIER
Original Filed Oct. 27, 1930  8 Sheets-Sheet 7

Inventor
GOTTLIEB R. MAGNEY
By Reif & Braddock
Attorneys.

May 27, 1941.    G. R. MAGNEY    2,243,281
HUMIDIFIER, HEATER, AND DEHUMIDIFIER
Original Filed Oct. 27, 1930    8 Sheets—Sheet 8
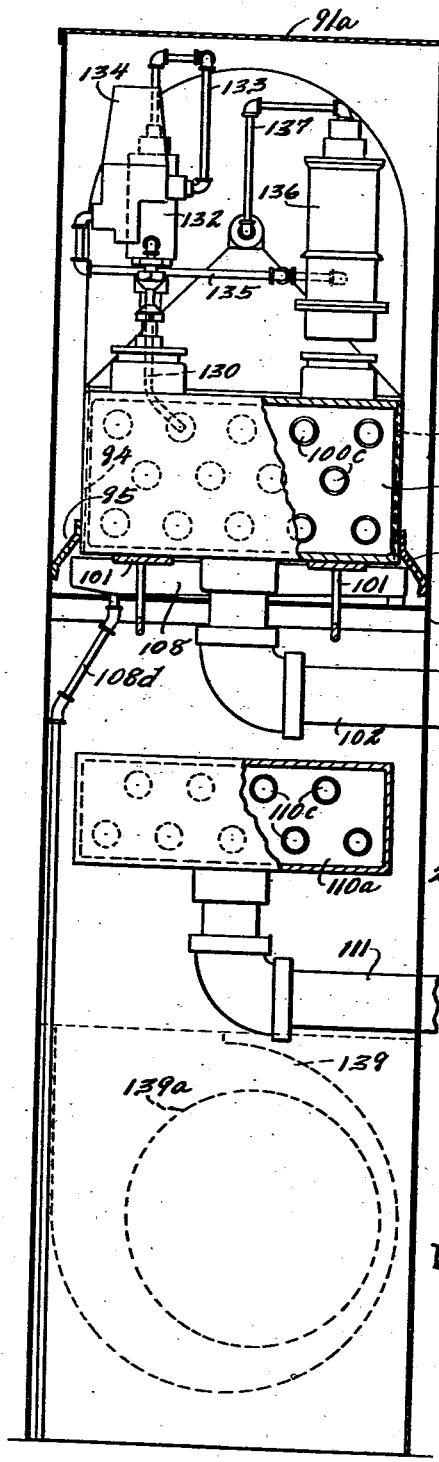
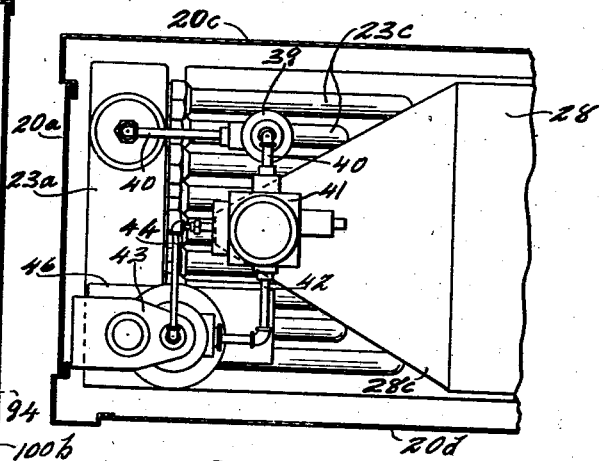
Fig.-17.
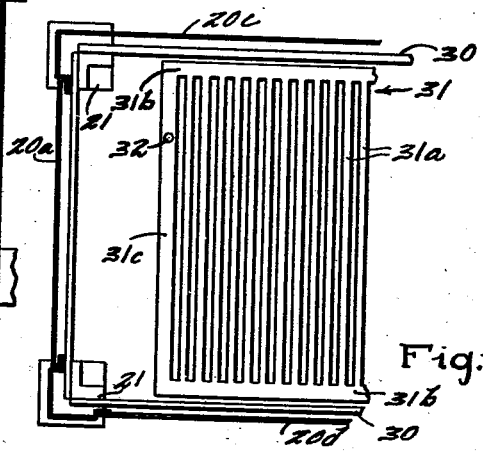
Fig.-18.
Fig.-19.
Inventor:
GOTTLIEB R. MAGNEY
By Reif & Braddock
Attorneys.

Patented May 27, 1941

2,243,281

UNITED STATES PATENT OFFICE 2,243,281

HUMIDIFIER, HEATER, AND DEHUMIDIFIER

Gottlieb R. Magney, Minneapolis, Minn.

Application October 27, 1930, Serial No. 491,466
Renewed March 22, 1940

25 Claims.  (Cl. 257—3)

This invention relates to a humidifying, heating, cooling and dehumidifying device. It is becoming quite common to equip residences, offices and other dwelling rooms, with devices for furnishing humidity, and to have devices for washing and purifying air which is to be delivered to rooms. It is also now the practice in many places, to supply rooms, especially such places as theatres, with cooled air, particularly in the warm seasons.

It is desirable to have in dwellings, offices and other buildings in which people are located, a device which will insure a proper degree of humidity in the atmosphere, and it is desirable to have such a device operating in connection with the heating system.

It is further desirable to have a device which can also be operated in hot weather to supply clean, cool and dehumidified air to the living rooms.

It is also desirable to have a device which can be automatically and accurately regulated to give the desired temperature and the desired degree of humidity.

It is also desirable to have properly humidified and heated air or cooled and dehumidified air supplied in certain industrial plants.

It is an object of this invention, therefore, to provide a simple and efficient device which can be operated to heat a room and maintain the desired degree of humidity, or which can be operated to supply cool, clean and dehumidified air to the room.

It is a further object of the invention to provide a device comprising a heat exchange element adapted to have a heating or cooling medium circulated therein, said member having cooperating therewith a multiplicity of members having liquid receiving surfaces, said members being contained in a casing forming a chamber above said members, together with means for delivering liquid preferably in a fine spray over said members, said casing having an inlet and outlet opening for air to pass therethrough, said air passing through said chamber and preferably between said members.

It is still another object to provide a device such as set forth in the preceding paragraph, together with means for moving air through said casing and chamber, as well as means for heating the liquid which is sprayed into said chamber.

It is still another object of this invention, to provide a heating, cooling and humidifying device comprising a heat exchange element or radiator having a plurality of tubes and having a multiplicity of liquid receiving plates mounted thereon and extending transversely thereof, said plates and tubes being enclosed in a casing forming a chamber thereabove, together with means for delivering a fine spray of liquid into said chamber over said plates, said casing having inlet and outlet means for air, which air passes therethrough.

It is also a further object of the invention to provide such a device as above set forth, together with means for heating the liquid by said radiator, with an additional heating means for said liquid.

It is more specifically an object of the invention to provide a heating, cooling and humidifying device comprising a radiator or heat exchange element having spaced headers with a plurality of conduits extending therebetween, adapted to receive a heating or cooling medium, a multiplicity of spaced inclined liquid receiving plates mounted on and extending transversely of said conduits, a casing enclosing said plates and a portion of said conduits, forming a chamber thereabove, said casing having an inlet opening for air below said plates and conduits, and an outlet opening for air extending from said chamber, means for discharging air into said inlet opening together with means for delivering a fine spray of liquid into said chamber and over said plates at a point spaced from said outlet opening.

It is a still further object of the invention to provide a device as set forth in the preceding paragraph, together with means for receiving liquid draining from said plates and conveying the same to a suitable drain, means for passing air through said casing, and an additional heating means in said casing.

It is also an object of the invention to provide such a device as set forth in the two preceding paragraphs, together with automatic control means for controlling the supply of heating or cooling medium in said heat exchange element, the supply of liquid to be sprayed, and the temperature of the liquid to be sprayed.

These and other objects and advantages of the invention will be fully set forth in the following description made in connection with the accompanying drawings, in which like reference characters refer to similar parts throughout the several views, and in which:

Fig. 7 is a view partly in side elevation and partly in vertical section of a further modified form of the device;

Fig. 9 is a view partly in end elevation and partly in vertical section of the device shown in Fig. 6, as seen from the left hand end thereof;

Fig. 10 is a view partly in section and partly in end elevation of the device shown in Fig. 6 as seen from the right hand end thereof;

Fig. 11 is a view in end elevation of the device shown in Fig. 7;

Fig. 12 is a partial vertical section through one of the tubes, headers and draining pan of the device shown in Fig. 6;

Fig. 13 is a wiring diagram of the device;

Fig. 17 is a horizontal section taken on line 17—17 of Fig. 3, as indicated by the arrows;

Fig. 18 is a horizontal section taken on line 18—18 of Fig. 2, as indicated by the arrows; and Fig. 19 is a vertical section taken substantially on line 19—19 of Fig. 7, some parts being broken away, as indicated by the arrows.

Figure 1:
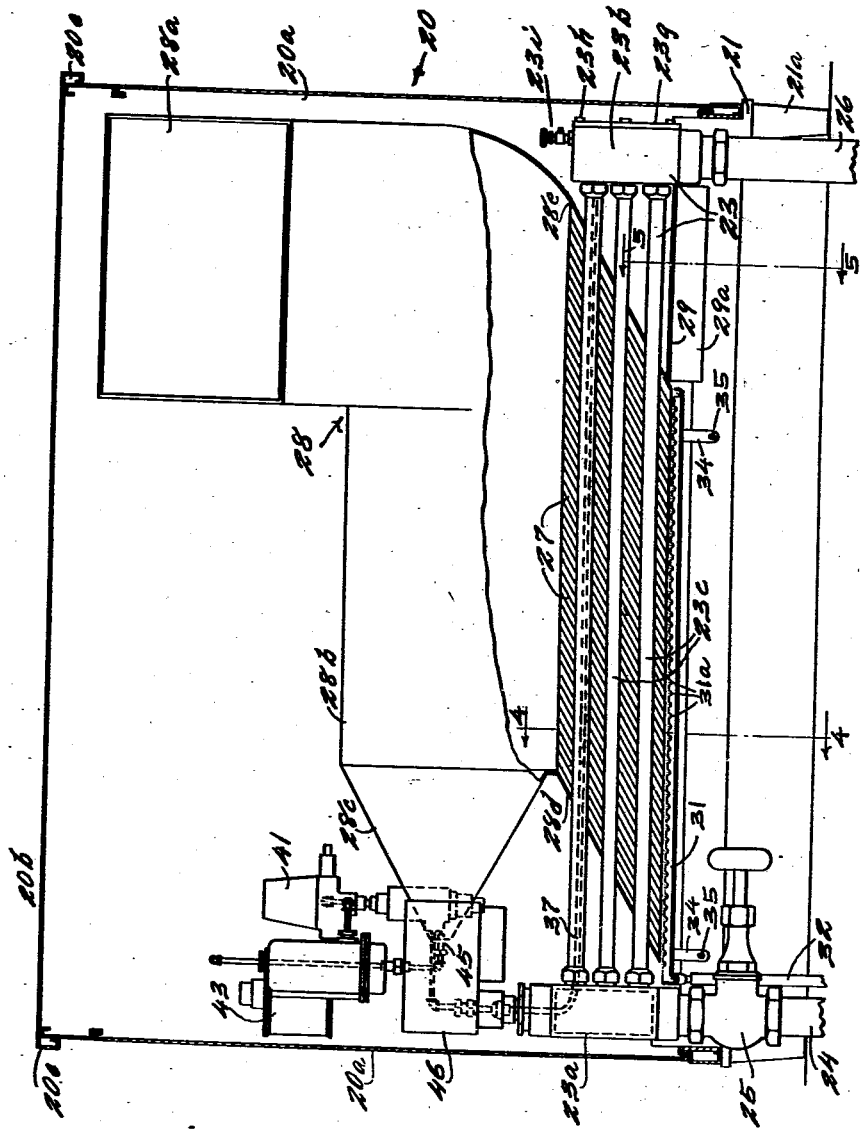
Fig. 1 is a view partly in side elevation and partly in section of the device embodying the invention.
Figure 2:
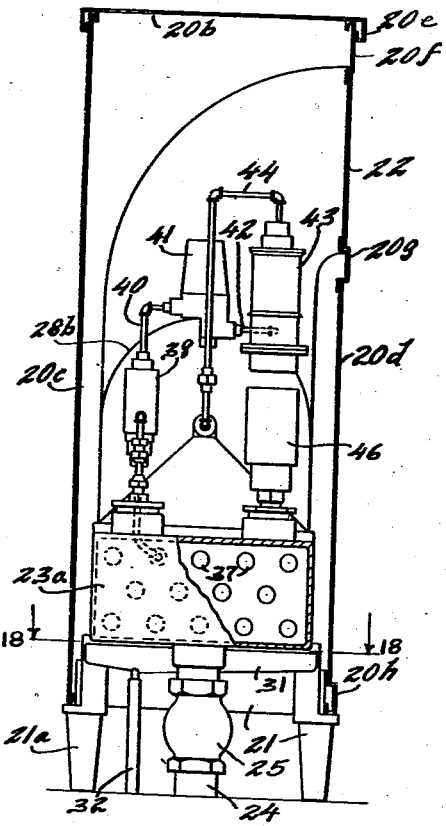
Fig. 2 is a view partly in vertical section and partly in end elevation of the device shown in Fig. 1, as seen from the left end thereof.
Figure 3:
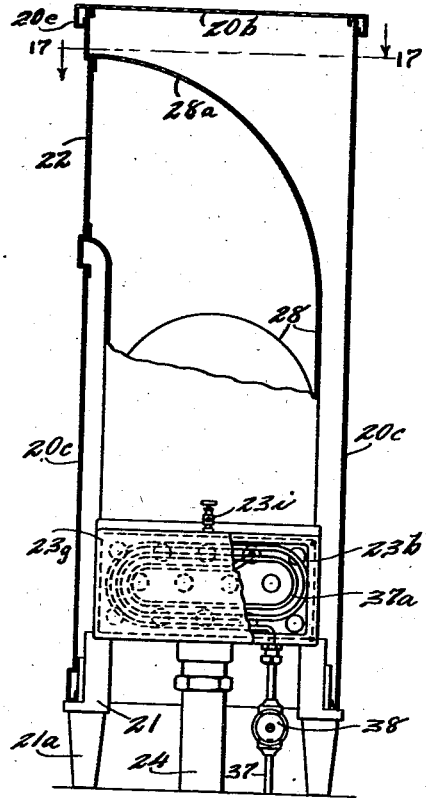
Fig. 3 is a view partly in end elevation and partly in vertical section of the device shown in Fig. 1 as seen from the right hand end thereof.
Figure 4:
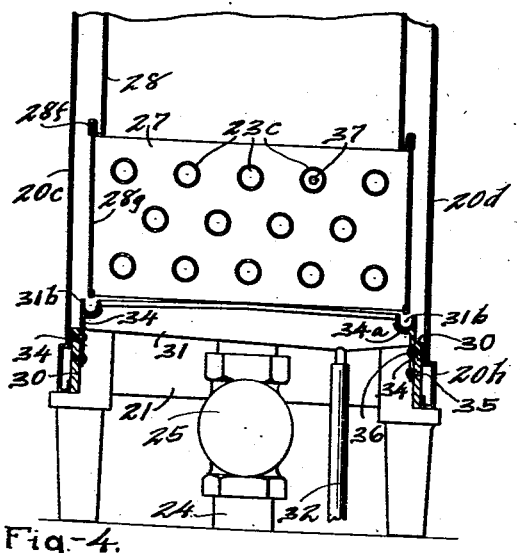
Fig. 4 is a vertical section taken substantially on line 4—4 of Fig. 1, as indicated by the arrows.
Figure 5:
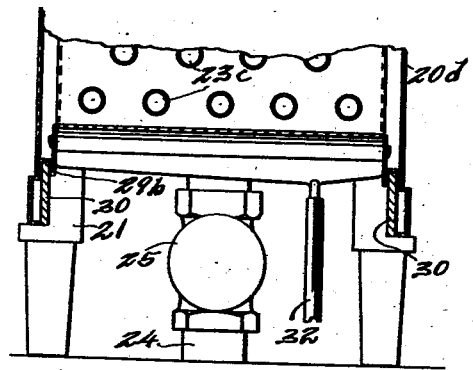
Fig. 5 is a view in vertical section taken substantially on line 5—5 of Fig. 1, as indicated by the arrows.

Referring to the drawings, particularly Figs. 1 to 5, a device is shown comprising a casing 20. This casing is illustrated as generally rectangular in horizontal and vertical cross section, and comprises the end walls 20a, the top 20b, the rear wall 20c, and the front wall 20d. The top member 20b has a projection of box or bead-like form 20e at its four sides, as shown in Figs. 1, 2 and 3, which fits over the end, front and rear walls. The rear wall 20c has its upper edge bent inwardly and reversely, as is also its lower edge, the top edge supporting top 20b and the lower edge resting on a ledge formed by a supporting frame 21 having four legs 21a disposed at the corners thereof and shown as tapering toward their lower surfaces which rest on the supporting floor. Frame 21 is of rectangular form having ledges at its ends and sides as seen in Figs. 1 to 5. The front wall 20d has openings therein adjacent the top, in which are disposed grid members 22 which preferably will be of ornamental form. Said front wall also has a section 20f above the grid 22 and a slightly projecting narrow section 20g below said grid. The front wall extends from section 20g downwardly and is formed at its bottom with another narrow projecting portion 20h which is also bent inwardly and reversely upwardly to rest on the ledge of the frame 21. The projecting portion 20e at the top and the projections 20g and 20h extend across the front wall and add to the ornamental appearance thereof. Disposed within the casing 20 is a heat exchange element 23 which comprises spaced header members 23a and 23b, located adjacent the ends of casing 20. Communicating with and extending between these headers, is a plurality of pipes or conduits 23c, said headers having projecting threaded lugs 23d (see Fig. 14) having beveled ends with which lugs cooperate the coupling members 23e. The tubes or conduits 23c are flanged outwardly at their ends and clamped between the members 23e and the ends of lugs 23d, a diaphragm 23f being also clamped between said parts and having an opening therethrough smaller than the internal diameter of pipe 23c. The header 23b has a removable end plate 23g held thereon by suitable screws 23h. An air relief valve 23i is shown as mounted upon the top of header 23b. Heating or cooling medium will be supplied to member 23 by a pipe or conduit 24 communicating with header 23a, which conduit will be controlled by the valve 25 which may be of the ordinary globe type. A return pipe for the medium in member 23 is shown as member 26, and this communicates with header 23b. The conduits 23c are shown as having mounted thereon and extending transversely thereof a multiplicity of plates 27. Plates 27 are illustrated as extending in an inclined direction and being substantially parallel and equally spaced. These plates preferably will be made of metal such as copper and it may be stated that tubes 23c will preferably be of metal such as copper. While plates 27 may be mounted on tubes 23c in any suitable manner, they are illustrated as formed in the manner shown in Fig. 14, said plates having openings formed therein through which tubes 23 respectively pass, said plates having the metal from said openings struck up to form flanges 27a substantially cylindrical in form which fit on the tubes 23c and support plates 27 thereon. A casing 28 is provided, disposed within casing 20, said casing having an upward extension at one end and extending in curved form to an outlet opening 28a registering with the opening covered by one of the grids 22, the walls of said casing 28 curving so as to fit at the top and bottom respectively of members 20g and 20f. The casing 28 also has an intermediate portion 28b with a semi-cylindrical top, which portion has at one end the conical extension 28c. Portion 28d and the portion having the outlet opening 28a have vertically extending sides with channels 28f fitting over plates 28g extending vertically to a horizontal plane substantially at the lower edges of plates 27 said plates 28g substantially engaging the edges of plate 27. Casing 28 has an end wall 28d extending from one end of portion 28b and the wide end of the conical portion 28c downwardly, spaced a short distance from and parallel with one of the end plates 27. The tubes 23c extend through portion 28d just as they do through the plates 27. Casing 28 has another end portion 28e extending vertically downward from opening 28a and then curving and extending slightly spaced from and substantially parallel with the opposite end plate 27. A plate 29 extends from the outer side of the end portion 28e and substantially at the bottom thereof horizontally to the inner side of the header member 23b, said plate 29 having downwardly extending vertical flanges 29a which, as shown in Fig. 5, are formed with rectangular channels 29b at their outer sides which rest on the top of bars 30 supported on the side ledges of the frame 21 and engaging the vertical sides of said frame. A drain member or pan 31 is disposed beneath the lower ends of plates 27 and end portions 28d and 28e of casing 28. While member 31 can be variously made, in the embodiment of the invention illustrated it is shown as formed from one piece of sheet material such as copper, and provided with a multiplicity of transversely extending troughs 31a which communicate at their ends respectively with troughs 31b, the bottoms of which incline downwardly toward one end of said pan and communicate with a trough 31c at one end of said pan, this being the left hand end as shown in Fig. 1. Member 31 has openings or slots 31d therethrough for the passage of air between the troughs 31a. Trough 31c has its bottom inclining from both ends to an intermediate point from which extends a drain pipe 32 which will be conducted to a suitable drain or sewer. Pan 31 has a plate 33 provided with a channel 33a at one edge fitting over the outer top edge of trough 31c and extending inwardly over the top of trough 31c substantially into contact with one end plate 27. Pan 31 is supported from frame 21 by a plurality of supporting lugs 34 shown as four in number and disposed adjacent the ends of the pan at each side thereof, which lugs are formed with curved trough-shaped portions 34a at their upper ends, fitting under the troughs 31b. The members 34 are pivoted on screws 35 threaded into the frame member 21 and may be held in vertical supporting position by screws or pins 36 also extending into frame 21. By the removal of members 36 the supporting lugs 34 may be swung downwardly and pan 31 removed.

It is desired to deliver a fine spray of liquid such as water into the chamber formed by casing 28, and for this purpose a tube or conduit 37 is provided, the same being shown as equipped with a regulating valve 38. Tube 37 extends into the header 23b and the same is formed into a heating coil 37a therein. Tube 37 extends from the heating coil 37a through one of the tubes 23c as shown in Fig. 1, and said tube then extends through a strainer or filter member 39. From member 39 a tube 40 extends to a magnetically operated valve 41 and the tube 42 extends from valve 41 to an electrical heating device 43. From the electrical heating device 43 a tube 44 extends into the end of the conical portion 28c of casing 28 and terminates in a spraying nozzle 45 constructed and arranged to deliver a very fine spray lengthwise of the casing portions 28b and 28c into the chamber thereof and over the plates 27. A Mercoid or thermostatically operated control device 46 is mounted on the header 23a and is suitably connected to the magnetically operated valve 41.

Figure 16:
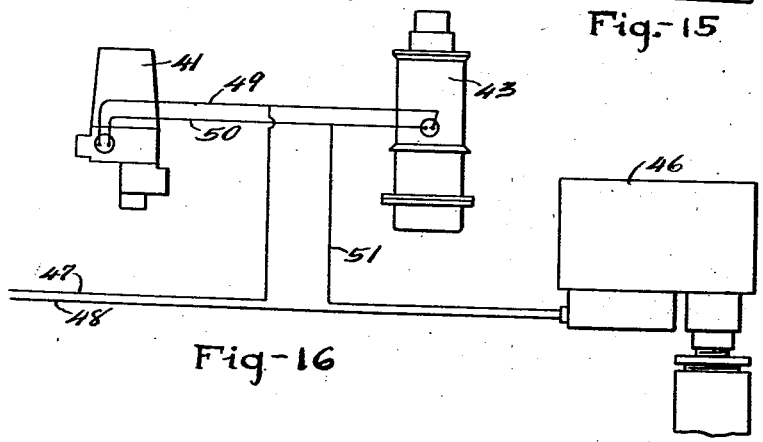
Fig. 16 is another wiring diagram.

In Fig. 16 the wiring diagram for the apparatus described is shown, and the magnetically operated valve 41, the electric heater 43 and the Mercoid control or thermostatically operated control device 46 are shown. Line conductors 47 and 48 are shown which will extend to some suitable source of electric current. Conductor 47 connects with a conductor 49 which extends to and is connected with the mechanism of members 41 and 43. Another conductor 50 is connected to members 41 and 43 and a conductor 51 is connected to conductor 50 and extends therefrom to the control member 46. It may be stated that the valve 41, the heater 43 and the Mercoid control device 46 are now standard pieces of apparatus and are commercially made and sold, and no specific description thereof is necessary, as the specific construction thereof forms no part of the present invention. The control device 46 is governed by the temperature of the heating medium in the heater 23a and so governs the valve 41, that no liquid is permitted to pass through tube 42 until a desired temperature is reached in the header 23a. The electric heater 43 is also controlled so that it will permit the passage of liquid through tube 44 when the liquid has been heated to a certain temperature.

In the operation of the device described, a heating medium such as steam or hot water will be supplied through pipe 24 to the header 23a, and the same will pass through the tubes 23c to the header 23b and out through the return pipe 26. The plates 27 will thus be heated. When the temperature in header 23a rises to a certain degree, the control member 46 opens the valve 41 and liquid is supplied from tube 37 to the heater 43. This heater will be then operated to heat the water to a desired predetermined degree and the water will pass from heater 43 to the nozzle 45 and will be directed in a very fine mist or spray longitudinally of the chamber in member 28 over the plates 27. It will be understood that tube 37 is connected to some source of water under pressure, such as the city mains. Air will rise through the bottom of the casing 20 and will pass into the bottom of casing 28. This air rises and passes through slots 31d between the plates 27 around the tubes 23c and passes through casing 28, thus passing through the fine mist or spray in said casing. A great deal of moisture is absorbed by the air and the air passes out through the outlet 28a through the grid 22 into the room. When the mist is sprayed into chamber 28, part of the same will fall on the plates 27. The moisture collecting on the plates will drain down the plates and any moisture reaching the bottoms of the plates will drop into the transversely extending troughs 31a of pan 31. The moisture will be conducted to one of the troughs 31b thence to trough 31c and out at the drain pipe 32. The plates 27 being heated will evaporate a portion of the moisture collecting thereon, and the air passing over the plates will pick up this evaporated moisture and will assist in the evaporation. The air is thus humidified by its cooperation with the plates 27 as well as by passing through the cloud of mist or spray in the casing 28. The air passes through a comparatively large inlet opening into the casing 28 and due to the fact that the outlet opening 28a is smaller, the air is confined in the casing 28 for a time, thus somewhat raising the pressure on the air and the temperature thereof. The air is of course heated by the tubes 23c and heated and humidified air is thus supplied to the rooms. The device thus acts both as a heater and humidifier.

Figure 6:
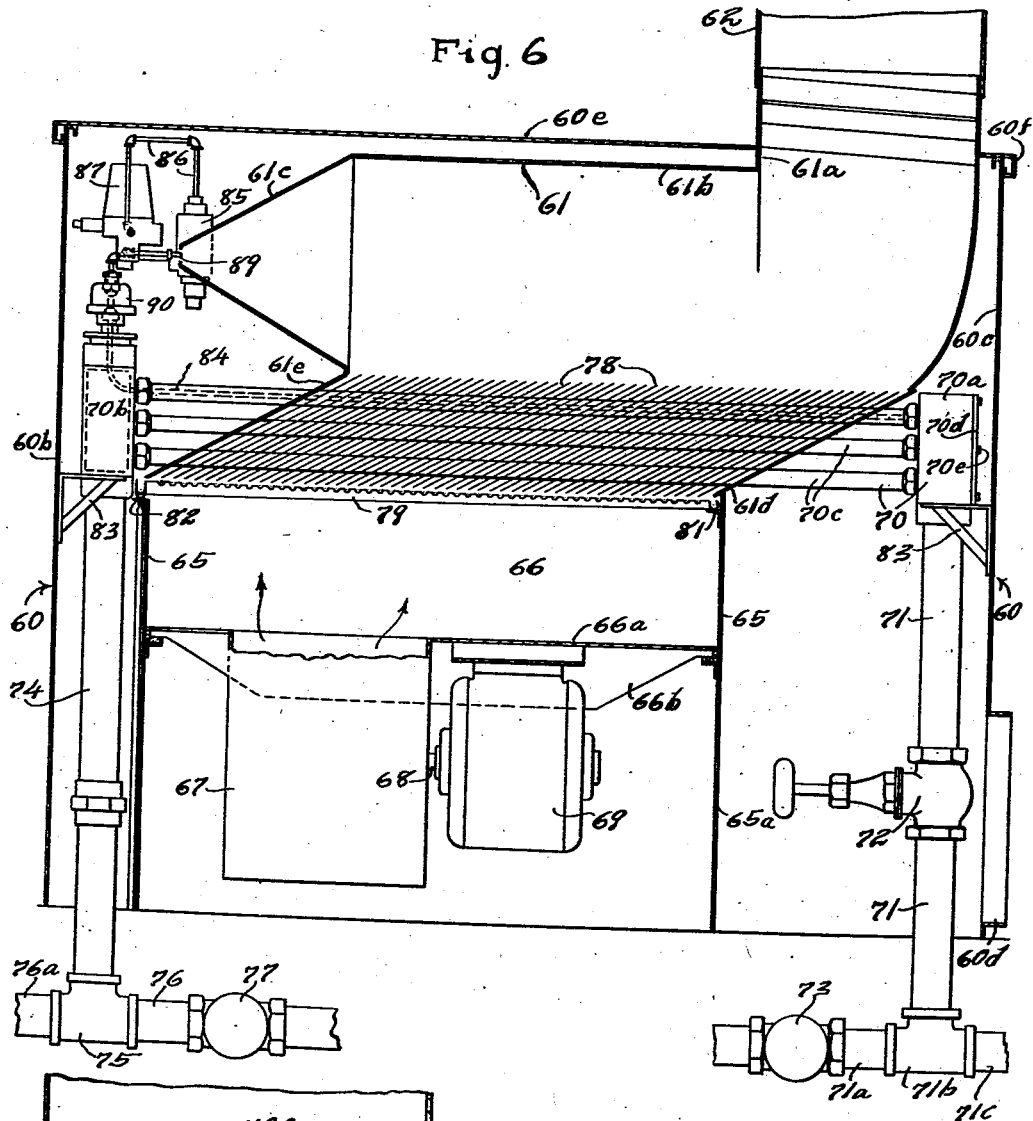
Fig. 6 is a view partly in side elevation and partly in vertical section of a modified form of the device, showing the invention.
Figure 8:
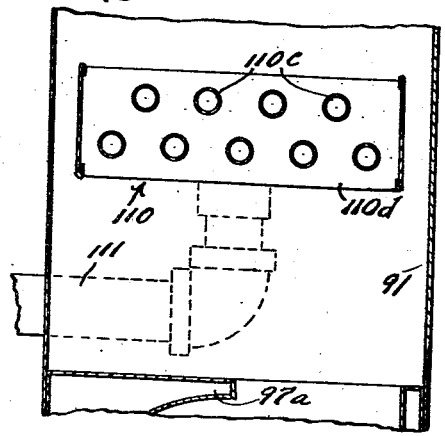
Fig. 8 is a view in vertical section taken substantially on line 8—8 of Fig. 7 as indicated by the arrows.

In the form shown in Fig. 6, a device is shown comprising a casing 60 substantially rectangular in vertical and horizontal cross section, the same having side walls 60a shown as adapted to rest upon a floor or supporting surface having their upper ends bent inwardly and reversely at right angles. Casing 60 also has an end wall 60b and another end wall 60c also adapted to rest upon a floor and having their upper ends bent similarly to those of side walls 60a. End wall 60c has an outwardly extending flange 60d adjacent its bottom forming an air inlet opening. A top 60e rests on and preferably is secured to the side and end walls, the same having a rectangular bead 60f extending around its outer side. Top 60e has an opening therethrough adjacent one end, through which projects the rectangular outlet extension 81a of the casing 61. Extension 61a has secured therein a plurality of baffle members 63 shown as formed from plates arranged in parallel relation and being of zigzag angular formation. Said plates have downwardly projecting lips 63a at their upper ends and also at their intermediate portions, as shown in Fig. 10. A conduit 62 is connected to and extends from the outlet conduit 61a, which conduit 62 will extend to the rooms to be heated, cooled or humidified. Casing 61 has an intermediate portion 61b which, as shown in Figs. 9 and 10, has a cylindrical top portion and vertical side portions. Said casing also has a conical end portion 61c with a small opening at its vertex. The end of casing 61 opposite portion 61c slopes downwardly and is connected to a downwardly inclined end portion 61d and another similarly inclined end portion 61e extends downwardly from the lower end of portion 61c. The vertical sides of casing 61 at their lower portions are formed with channels 61f into which fit the plates 64 extending vertically and forming in effect extensions of the vertical sides of chamber 61. Vertical end plates 65 also extend downwardly from the lower ends of portions 61d and 61e. Plates 64a extend from the sides of plates 64 to the side walls 60d and between portions 61e and 61d of casing 61. Plates 65 with the side walls 60a and a bottom plate 66a supported on the latter, and on a bracket 66b secured to the side wall 60a, form a chamber 66. A fan casing 67 is supported by plate 66a and has a discharge opening 67a communicating with chamber 66. Said casing 67 contains a fan (not shown) mounted upon a shaft 68 forming the armature shaft of the motor 69 suitably supported from plate 66a. Fan casing 67 has an inlet opening 67b in the side adjacent motor 69 and one vertical wall 65 has an opening 65a therein so that air can pass to the fan casing 67 through opening 65a and the opening through flange 60d. A heat exchange element 70 is provided, comprising spaced headers 70a and 70b between which extend the tubes 70c. Heating or cooling medium is supplied to the header 70a by the conduit 71 shown as controlled by the valve 72 illustrated as of the ordinary globe type. Pipe 71 is shown as connected to another supply pipe 71a also having therein the valve 73. A T 71b connects pipe 71 to pipe 71a and also connects pipe 71 to another supply pipe 71c. Header 70b has connected thereto a return conduit or pipe 74. Pipe 74 also connects through a T 75 to another return pipe 76a, said pipe also being connected to another return pipe 76 controlled by a valve 77. Header 70a has a removable end plate 70d secured thereto by the screws 70e. A plurality of plates 78 are mounted on the tubes 70c, said plates being arranged in spaced parallel relation and in inclined position, the same extending substantially parallel to the portion 61d and 61e of the casing 61. A drain pan 79 is disposed below the plates 78, which pan is of the same structure as the pan 31 already described, and from which leads a drain pipe 80. Pan 79 is shown as resting upon brackets 81 and 82 secured respectively to the end walls 65 of chamber 66. The headers 70a and 70b are supported upon angle brackets 83 secured respectively to end walls 60b and 60c of the casing 60. A tube or conduit 84 is provided for supplying a liquid such as water under pressure, which tube passes into header 70a and is connected to or formed into a heating coil 84a the same being shown as controlled by a valve 84b. Said tube extends from heating coil 84a through one of the tubes 70c to a strainer or filter 85. A similar tube 86 leads from strainer 85 to a magnetically controlled valve 87 and a tube 88 leads from valve 87 and has connected thereto a nozzle 89 projecting into an opening in the small end of conical portion 61c. An air relief valve 90 is shown as connected to the header member 70b.

In Fig. 7 another form of the device is shown, comprising a casing 91 also of rectangular shape, the same having side and end walls extending to a supporting surface, and on which is fitted the top 91a. One end wall has the flange 91b surrounding an opening therein, over which fits an air supply conduit 92. Top 91a has an opening therethrough adjacent one end, through which extends the outlet portion 93a of a casing 93, said portion 93a being preferable of rectangular form. Portion 93a has secured therein a series of baffle plates 94 similar to baffle plates 63 in outlet extension 61a shown in Fig. 10. Casing 93 has an intermediate portion extending from outlet 93a and has at its other end a conical portion 93b. The end of the casing opposite conical portion 93b curves downward and has a downwardly inclined portion 93c. A similar portion 93d extends downwardly in an inclined direction from conical portion 93b. The top of the intermediate portion of casing 93 is semi-cylindrical in form, and has vertical sides extending downwardly, similar to the sides of the casing 61. The side walls of casing 93 extend vertically and are connected to plates 94 similar to plates 61f shown in Fig. 10 and these plates extend down along the sides of plates 107. Plates 95 extend from the sides of the plates 94 to the side walls of casing 91 and between plates 93c and 93d. Vertical plates 96 extend vertically and between the side walls of casing 91, and a horizontal plate 97 extends between plates 96 quite a distance above the bottom of casing 91 being also supported by a bracket 97a secured to the side wall of casing 91. A chamber 98 is thus formed between plates 96 and the side walls of casing 91, which chamber extends upward between plates 95 and 94 and is continuous with casing 93. A heat exchange element 100 is disposed in casing 91 and comprises header members 100a and 100b between which extend the tubes 100c. Header 100a has a removable front plate 100d shown as held in place by bolts 100e. An air relief valve 100f is shown connected to the top of header 100a. Headers 100a and 100b are supported on angle brackets 101 secured respectively to the end walls of casing 91. A supply pipe or conduit 102 is connected to header 100b, which pipe extends through the side wall of the casing 91 and communicates with a T 104. A return pipe 105 leads from header 100a and this pipe extends through a side wall of casing 91 and is connected to a T 106. A multiplicity of plates 107 are mounted on tubes 100c, being slightly spaced and in parallel relation, extending parallel to plates 93c and 93d. Alternate plates 107 are shortened at their lower edges so as to terminate above the lower edge of the plate to the right as shown in Fig. 12, and the longer plates have their lower edges disposed vertically above transverse troughs 108a formed in a drain pan 108 which pan is substantially similar to pan 79 and pan 31 already described, and which has a trough 108b at one end receiving drainage from side troughs 108c into which the transverse troughs 108a discharge. As shown in Fig. 12, the plates 107 have cylindrical flanges 107a struck up from the openings therein, which fit the tubes 100c. These tubes are connected to the headers 100a and 100b by the coupling members 100f threaded onto the projecting exteriorly threaded lugs on said headers. The ends of said lugs are beveled and the coupling 100f has a beveled portion engaging the outwardly extended flange on the tube 100c, a washer or diaphragm member 100g also being clamped between said lugs and coupling. Member 100g has an opening therethrough somewhat smaller than the opening in tube 100c. A plate 109a is formed with a channel member engaging the outer edge of the trough 108b, which plate extends over the endmost plate 107. A drain pipe 108d extends from the bottom of trough 108b and will be led to a suitable sewer or drain. Trough 108 is supported on angle brackets 109 secured respectively to the walls 96. A second heat exchange element or radiator 110 is disposed in casing 91 and comprises the header members 110a and 110b, between which extend the tubes 110c. A multiplicity of plates 110d are mounted on and extend transversely of the tubes 110c, said plates being shown as in slightly spaced parallel relation and extending at right angles to tubes 110c. A relief valve 110e is connected to header 110b. Header 110a has connected thereto a supply pipe 111 which extends through the side wall of casing 91 and connects with a T 112. The T's 104 and 112 are connected to a pipe 113 which extends to a control valve 114 connected by a link and lever mechanism 115 to a magnetically operated or Mercoid control member 116. Valve 114 has connected thereto a pipe 117 which communicates through a T 118 with a cooling medium supply pipe 119 controlled by a suitable valve 120. Pipe 117 also communicates with a pipe 121 connected to the heating medium supply and it is also controlled by a valve 122. A return pipe 123 leads from header 110b and extends through the side wall of casing 91 where it is connected to a T 124. A return pipe 125 for the heating medium is connected to T 124, the same being controlled by valve 126, and a cooling medium return pipe 127 is connected to T 106, the same being controlled by a valve 128. A pipe 129 also connects the T's 106 and 124. One vertical wall 96 adjacent the inlet conduit 92 has an opening therethrough for the passage of air.

It is desired to project a spray in casing 93, and for this purpose a tube 130 is provided, which extends into header 100a where it is formed into a heating coil 130a, said tube 130 then extending through one of the tubes 100c to and through the header 100b. Tube 130 is of sinuous form in tube 100c to allow for expansion and contraction. It may be stated that tubes 37 and 84 will be similarly formed. Tube 130 extends from the header 100b into a strainer or filter 132. From filter 132 a tube 133 leads to a magnetically operated valve 134 and a tube 135 leads from valve 134 to an electrical heating member 136. A tube 137 leads from the electrical heater 136 to a spray nozzle 138 projecting into an opening in the smaller end of conical portion 93b of casing 93. The nozzle 138 is constructed and arranged to deliver a very fine spray of liquid such as water into casing 93 over the plates 107. A pair of fan casings 139 are disposed below chamber 98 and have discharge openings leading thereinto, each of said casings containing a fan (not shown) connected to a shaft 140 which may constitute the armature shaft of a motor 141. Fan casings 139 have openings 139a therein for the passing of air.

In Fig. 13 the wiring diagram for the device shown in Figs. 7, 8, 11 and 12 is shown. Conductors 142 and 143 are shown, which will extend to suitable source of supply of electric current and conductor 142 extends to one central contact of a double throw switch 144. The contacts at one side of the switch are connected by conductors 145 and 146 to a thermostat 147 which will be disposed in the rooms to be treated or supplied with air. The other side of the switch 144 has a pair of contacts connected respectively by conductors 148 and 149 to a humidostat 150 which also will be located in the rooms to be supplied with air and heat. Conductor 151 leads from the other central contact of switch 144, which central contacts will, of course, be connected to the movable member of the switch and this conductor 151 extends to the motor 141 which is shown, as are also the fan casings 139.

Another conductor 152 extends from motor 141 to the other supply conductor 143. A conductor 153 extends from conductor 151 to the magnetically operated control member 116 for the valve 114. Conductor 143 also extends to member 116. A pair of conductors 154 extend respectively from conductors 143 and 153 to the magnetically operated valve 134. A pair of conductors 155 extend respectively from the conductors 154 and are connected to the electrical heating member 136. It may be stated that the wiring diagram used with the structure shown in Figs. 6, 9 and 10 is the same as that shown in Fig. 13, with the exception that the electrical heater 136 and the magnetically operated control member 116 are omitted and the conductors leading to these members, of course, will be omitted.

In the operation of the device shown in Figs. 6, 9 and 10, when the device is to be used as a heating and humidifying device, heating medium will be supplied through pipe 71c, valve 73 at this time being closed and valve 72 open. This heating medium will pass into the header 70a and through the tubes 70c to the header 70b and will return through pipes 74 and 76, valve 77 being open. Plates 78 will be heated by the tubes 70c. When the humidity in the rooms to be heated falls to a certain degree, or the temperature falls to a certain point, humidostat 150 or thermostat 147 will operate, depending upon which is being used, and motor 69 will be started and magnetically operated valve 87 will be operated to permit flow of fluid through tube 84 and nozzle 89. It will be understood that at this time the switch 144 will have its movable member in contact with the side connected to either the thermostat or humidostat, depending upon which is being used. Air will now be discharged from fan casing 67 into chamber 66 and this air will pass through the openings in pan 79 between plates 78 and over the tubes 70c upward into the chamber in casing 61. A very finely divided spray will be discharged longitudinally of the casing 61 from nozzle 89, the spray passing over the plates 78. The air passing through the casing 61 will absorb quite a lot of the moisture from the spray. The liquid sprayed will descend and will collect on the plates 78 and when in sufficient quantities, will run down these plates. Any liquid dropping from the lower edge of the plates will pass into the transverse troughs of pan 79 and will drain down the side troughs into the end trough, from where it will pass out through the drain pipe 80. Plates 78 being heated, will evaporate moisture collecting thereon, and the air passing between the plates will also pick up this moisture and carry it out of casing 61. The air passes out through the discharge portion 61a and the same engages the baffle plates 63 before leaving portion 61a. Should any drops of moisture be carried along with the air, they will engage baffle 63 and be prevented from passing on out through conduit 62 and to the rooms. It will be seen that an effective baffling effect will be produced by the plates 63 and the lips 63a thereon. The air delivered from this casing 67 is guided upwardly between the tubes 70c and between plates 78, since a continuous chamber is formed by the sides of the casing 60, plates 64a and plates 64, thus guiding the air into casing 61. The rooms will thus be heated and supplied with the desired degree of humidity. When the humidity has reached the desired degree, or the temperature has risen to a certain point, the humidostat 150 or thermostat 147 will again operate and motor 69 will be stopped and the magnetically controlled valve 87 will be controlling the nozzle 89 will be closed. The water is strained or filtered as it passes through nozzle 89, so that no trouble will be experienced with such nozzle clogging. A very effective humidifying and heating effect is thus obtained. It will be noted that the liquid sprayed is heated by the heating coil 84a and is also heated by the passage of tube 84 through the heating tube 70c. The liquid therefore has very little, if any, cooling effect on the plates 78 or the tubes 70c.

If the device is to be used as a cooling device and for supplying cool and cleansed air to the rooms, as is desirable in hot weather, then a cooling medium such as cold water or some refrigerant will be supplied to the member 70 through pipe 71a, valves 73 and 72 at this time being open and the valve in pipe 71c closed. The cooling medium will pass into the header 70a through the tube 70c and into the header 70b, from where it will pass out through return pipe 74 and to return main 76a, valve 77 being closed. When the temperature rises beyond the desired degree, thermostat 147 will operate, the movable member of switch 144 at this time being connected to the side connected to the thermostat. The motor is started, and the magnetically operated valve 87 will be operated and the spray will be directed into the casing 61. The liquid in tube 84 will be cooled and said spray will be cold. The plates 78 will be cooled by the medium in the tubes 70c and air will be discharged from fan casing 67 into chamber 66 and around the tubes 70c and between plates 78 and into the casing 61. This air passes through the spray in the casing 61 and will pass out through the discharge portion 61a, the same striking and passing between the baffle plates 63 where any excess moisture will be removed. The air is effectively cooled, washed and dehumidified, and the air is discharged into the rooms. The cold spray and cold tubes 70c and cold plates 78 will precipitate the vapor in the air and the air will be cooled and the humidity greatly reduced. Any moisture draining from plates 78 will drain into the troughs in pan 79 and will pass out through drain pipe 80 as already described. The temperature is thus kept at the desired point and fresh cooled and cleansed air is supplied. When the temperature drops to the desired point, thermostat 147 will operate and motor 69 will be stopped and the valve 87 will shut off the nozzle 89.

Figure 14:
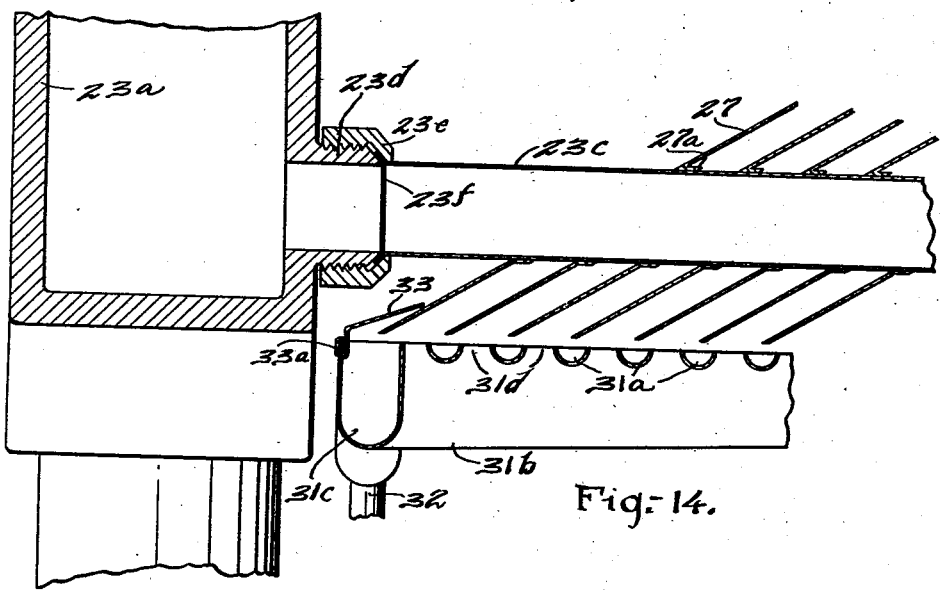
Fig. 14 is a view similar to Fig. 12, shown on an enlarged scale.
Figure 15:
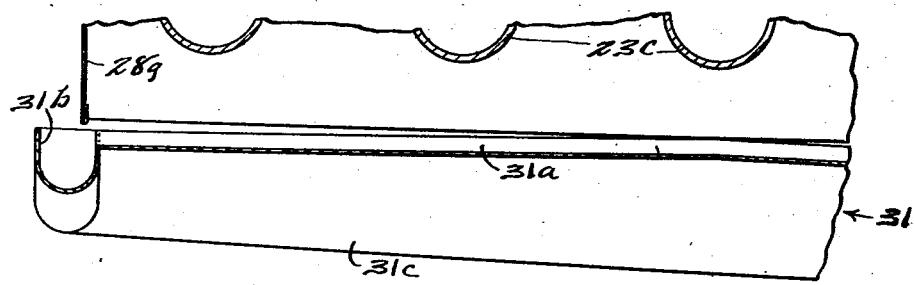
Fig. 15 is a transverse section of the drain trough and a portion of the header shown on an enlarged scale.

In the operation of the device shown in Figs. 7 and 14, when the device is to be used as a heating and humidifying unit, heating medium will be supplied from the heat supply pipe 121, valve 122 being open. The device can be controlled by either the thermostat 147 or the humidostat 150 as desired. Switch 144 will be thrown to place one or the other in operative position. When said member operates, motor 141 will be started and the control member 116 will be operated, as will also the magnetically operated valve 134. The heating medium will thus not be supplied until the temperature or humidity in the rooms falls below a certain point. The heating medium is supplied to member 100 and tubes 100c will be heated. The motor 141 will operate the fans in casings 139 and air will be directed into chamber 98. Heat is also supplied to the radiator 110 and the tubes 110c and the plates 110d will be heated.

The air passing into chamber 98 is heated by the additional radiator 110 and this air then passes upwardly through openings 108c in pan 108 over and between the plates 107 and tubes 100c. Spray is directed into the casing 93 by nozzle 138 and the action of this spray on the plates 107 and the cooperation of the air therewith will be as already described in connection with the device as shown in Figs. 1 and 6, and the air will pass out of casing 93 after encountering the baffle plates 94. The liquid for the spray will be preheated by passing through the heating coil 138a and by the tube 130 passing through the tube 100c. The electric heater 136 will be controlled so that the liquid will be further heated to have a certain temperature before it can be discharged from nozzle 138 into casing 93. A very effective atomization is thus produced, and a good evaporation of the liquid on the plates 107 is had. A clean, heated and thoroughly humidified air is thus delivered to the rooms.

When the device is to be used for supplying cooled, cleansed and dehumidified air, a cooling medium will be supplied to the members 100 and 110, this cooling medium being supplied through pipe 119, valve 120 being open. The device will preferably be controlled at this time by the thermostat 147, switch 144 being set to put the thermostat in operation. When the temperature rises beyond a certain point, thermostat 147 will operate and the motor 141 will be started. Valve 114 will be opened by control member 116 and the magnetically operated valve 134 will be operated. The heater 136 will at this time be cut out of operation. Air will be forced into chamber 98 and will pass the member 110, said air passing between the tubes 110c and the plates 110d. The air is thus initially cooled and the same will pass upwardly through the openings 108e in pan 108 and between plates 107 and tubes 100c. A cool spray will be delivered into casing 93, some of which spray will descend and collect on plates 107. These plates will now be cooled by the medium in the tubes 100c and the air passing between the plates will also be cooled and the humidity therein reduced and this air will pass through the cold spray in chamber 93, being here further cooled. It will be understood that any moisture draining from plates 107 will be caught in the transverse troughs 108a and will pass through the side troughs 108c to the end trough 108b, from which it will drain out through the drain pipe 108d. The air is forced from casing 93 and will encounter the baffle plates 94 as it leaves the casing, where any excess moisture will be removed. The air is thus delivered to the rooms in cooled, washed and dehumidified condition. The temperature of the rooms will be kept down to the desired point, and a healthful atmosphere maintained. Under some conditions it may be desirable to regulate the device, when being used to cool the air, by the humidostat. Such conditions might arise in industrial plants where it would be considered more important to control the humidity than the temperature. The devices shown in Figs. 6 and 7 could thus be operated as cooling devices, and switch 144 would be disposed as desired to place either the humidostat or thermostat in operation.

From the above description it is seen that applicant has provided a simple and efficient apparatus adapted to be used for heating and humidifying the air in a room, and also adapted for supplying a cooled, clean and dehumidified air to the rooms. The device can thus be effectively operated in either winter or summer. The device can be effectively operated for supplying cool and dehumidified air by using cold water or a special refrigerant. The water in the usual city mains of some cities is sufficiently cool to secure a very effective cooling and dehumidifying of the air, even in hot weather. The device illustrated in Fig. 1 can be installed in the rooms as an ordinary radiator. The device shown in Figs. 6 and 7 will preferably be installed in a room or rooms other than the room to which the air is delivered and these devices will be arranged to deliver air to a plurality of rooms. Such devices will usually be installed in a basement room.

The device is quite simple in construction, and is easily made and installed. The device is quite sensitive and can be controlled to regulate the temperature and humidity in the rooms within very small limits. The same is entirely automatic in operation and requires no operator in attendance. The device has been amply demonstrated in actual practice, and found to be very successful and efficient.

This application is a continuation in part of applicant's previously filed application S. N. 430,779, filed February 24, 1930, for "Humidifying device."

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:

1. A heating, cooling and humidifying device having in combination, a heat exchange element comprising spaced headers and tubes extending therebetween, a multiplicity of spaced liquid receiving plates mounted on said tubes, a casing enclosing said plates and the portions of said tubes engaged thereby, forming a chamber above said plates, said casing having inlet and outlet openings for air whereby said air passes between said plates and through said chamber, means for directing a finely divided spray of liquid into said chamber over said plates, a conduit for supplying liquid to said means, and a heating means in one of said headers to which said conduit is connected.

2. A heating, cooling and humidifying device having in combination, a heat exchange element comprising spaced headers and tubes extending therebetween, a multiplicity of spaced liquid receiving plates mounted on said tubes, a casing enclosing said plates and the portions of said tubes engaged thereby, forming a chamber above said plates, said casing having inlet and outlet openings for air whereby said air passes between said plates and through said chamber, means for directing a finely divided spray of liquid into said chamber over said plates, a conduit for supplying liquid to said means, said conduit passing through one of said tubes in said heat exchange element, and a heating coil in one of said headers to which said conduit is connected.

3. A heating, cooling and humidifying device having in combination, a radiator, a plurality of liquid receiving plates spaced along said radiator, a casing enclosing said plates and forming a chamber above the same and said radiator, means for directing a finely divided spray of liquid into said chamber over said plates, means for preheating said liquid by said radiator, and an auxiliary heating means for subsequently heating said liquid before it is sprayed.

4. A heating, cooling and humidifying device having in combination, a heat exchange element adapted to receive a heating or cooling medium and comprising a plurality of tubes extending side by side, a number of plates supported on said tubes through which said tubes pass, said plates being inclined to said tubes, a casing enclosing said plates and tubes and forming a chamber thereabove, and a chamber therebelow, means for delivering a finely divided spray of liquid into said first mentioned chamber over said plates, means including a fan and motor for discharging air into said chamber below said plates, said chamber above said plates having an outlet for air, an automatically controlled valve for controlling said means for delivering said spray, a thermostat in the rooms to be heated or cooled, a humidostat in the rooms to be heated or cooled, a double throw switch having contacts connected respectively to said thermostat and humidostat, said switch being connected by suitable conductors to said automatically operated valve, and to said motor whereby said switch may be thrown so that said motor and valve will be controlled by said thermostat or by said humidostat.

5. A heating, cooling and humidifying device having in combination, a radiator, a multiplicity of spaced liquid receiving plates disposed along and above said radiator, a casing enclosing said plates and forming a chamber above the same and said radiator, means for delivering a finely divided spray of liquid over said plates, means for forcing air into said chamber between said plates and through said chamber, said chamber having an outlet means for air, means for supplying a heating medium to said radiator, an automatically controlled device for regulating said last mentioned means so that heating medium will be supplied at a certain temperature, an automatically operated device controlling said means for delivering a spray so that said spray will be delivered at a certain temperature, and automatically operated means for controlling said means for forcing air so that said air will be delivered at certain times.

6. A heating, cooling and humidifying device having in combination, a casing having an inlet opening, an outlet opening adjacent its top, and at its front aforesaid inlet opening, a heat exchange element in said casing comprising a plurality of conduits extending through said casing, means for supplying either a heating medium or a cooling medium to said element, a plurality of liquid receiving and evaporating elements carried by said conduits to be heated or cooled thereby, means for forcing air through said casing between said members and over said conduits, and means for delivering either a heated finely divided spray of water or a cool spray of finely divided liquid into said casing and over said conduits and members.

7. A heating, cooling and humidifying device having in combination, a heat exchange element adapted to receive either a heating or cooling medium, comprising conduits and a plurality of spaced parallel inclined plates carried thereby, means for supplying a heating medium to said element, means for supplying a cooling medium to said element, a casing surrounding said element and plates and forming a chamber thereabove, and a spraying means for projecting finely divided liquid into said chamber over and above said conduits and plates, and means for passing air through said casing about said conduits and plates.

8. A heating, cooling and humidifying device having in combination, a casing having an inlet opening and an outlet opening adjacent its top and above said inlet opening, a heat exchange element comprising a plurality of tubes disposed in said casing, means for supplying either a heating medium or a cooling medium to said element, a plurality of liquid receiving members associated with and heated by said tubes, said casing having a chamber therein extending over and above said element and members, means for forcing air through said casing, and means for delivering a fine spray of water into said chamber over and over said members and tubes whereby said air passes from said inlet opening over said element and members through said spray and out at said outlet opening.

9. A humidifying device having in combination, a casing, air inlet openings adjacent either side of said casing and at the bottom thereof, and an outlet opening at the front and adjacent the top thereof, conduits disposed in said casing below said outlet opening adapted to receive a cooling medium, plates for receiving moisture condensing on said conduits, said casing having a chamber therein above said conduit and plates and between the same and said outlet drain means for carrying said moisture from said casing, a pair of fans disposed respectively below said inlet openings for forcing air therethrough and a common means for driving said fans.

10. A humidifying apparatus having in combination, a heating means, means for delivering liquid adjacent said heating means for evaporation thereby, an electrically controlled valve for controlling the supply of liquid to said means, a thermostat, a humidostat, a double pole switch having its poles connected respectively to said thermostat and humidostat and also being connected to said valve whereby said switch may be positioned to connect said valve to either said thermostat or humidostat.

11. A humidifying apparatus having in combination, a heating means, means for delivering liquid adjacent said heating means for evaporation thereby, an electrically controlled valve for controlling the supply of liquid to said means, a fan for delivering air to be humidified by said liquid, a motor for driving said fan, a thermostat, a humidostat, a double pole switch having its poles connected respectively to said thermostat and humidostat and also being connected to said motor and valve whereby said valve and fan may be controlled by either said thermostat or humidostat.

12. A humidifying apparatus having in combination, a housing, a radiator in said housing, a casing within said housing, said casing having an outlet portion discharging through the top of said housing, moisture-eliminating means in said portion and means for discharging spray longitudinally of said casing toward said outlet opening.

13. A humidifying apparatus having in combination, a housing, a radiator in said housing, a casing within said housing extending longitudinally thereof having an outlet portion discharging through the upper end of said housing and means for projecting liquid in finely divided condition longitudinally of said casing toward said outlet opening.

14. A humidifying apparatus having in combination, a housing, a radiator in said housing, a casing within said housing having a horizontally extending portion and a vertical outlet portion discharging through the upper end of said housing and means for projecting liquid in finely divided condition longitudinally of said casing into said horizontal portion and means for causing a flow of air through said casing, through said spray and out at said outlet portion.

15. A heating, cooling and humidifying device having in combination, a casing having an inlet opening and an outlet opening adjacent its top and above said inlet opening, a heat exchange element therein below said outlet opening adapted to receive either a heating or cooling medium, means for supplying either a heating or cooling medium to said element, means associated with said element comprising liquid receiving surfaces, a casing having a chamber extending over said element and surfaces, means for delivering a finely divided spray of water into said chamber and over said surfaces and element, means for forcing air through said casing and over said surfaces and means for automatically controlling the operation of said last mentioned means.

16. A heating, cooling and humidifying device having in combination, a casing having an inlet opening and an outlet opening adjacent its top and above said inlet opening, a heat exchange element therein below said outlet opening adapted to receive either a heating or cooling medium, means for supplying either a heating or cooling medium to said element, means associated with said element comprising liquid receiving surfaces, said casing having a chamber extending over said element and surfaces, means for delivering a finely divided spray of water into said chamber and over said surfaces and element, means for forcing air through said casing and over said surfaces and means for automatically controlling said third mentioned means.

17. A heating, cooling and humidifying device having in combination, a casing having an inlet opening and having an outlet opening adjacent its top above said inlet opening, a heat exchange element in said casing below said outlet opening adapted to receive either a heating or cooling medium, means for supplying either a heating or cooling medium to said element, means associated with said element comprising liquid receiving surfaces, said casing having a chamber above and over said element, means for delivering a finely divided spray of water into said chamber above said surfaces and element and means for forcing air through said casing and over said surfaces.

18. A heating, cooling and humidifying device having in combination, a casing having an inlet opening and an outlet opening above said inlet opening, a heat exchange element in said casing below said outlet opening adapted to receive either a heating or cooling medium, said casing having a chamber therein above said element, means for supplying a heating medium to said element, means for supplying a cooling medium to said element, a plurality of evaporating means comprising spaced surfaces associated with said element and heated thereby, means for delivering a fine spray or mist of water into said chamber over said element to engage said surfaces and element and means for passing air from said inlet opening over said element and surfaces and through said spray to said outlet opening.

19. A heating, cooling and humidifying device having in combination, a casing having an inlet opening and an outlet opening adjacent its top and above said inlet opening, a heat exchange element therein below said outlet opening adapted to receive either a heating or cooling medium, means for supplying either a heating or cooling medium to said element, means associated with said element comprising liquid receiving surfaces, a chamber in said casing extending longitudinally over said element and surfaces, means for delivering a finely divided spray of water into said chamber longitudinally thereof and over said surfaces and element, means for forcing air through said casing from said inlet to said outlet opening and over said surfaces and means for automatically controlling the supply of heating medium to said element.

20. A humidifier structure comprising a radiator, a casing enclosing said radiator having an inlet opening for air adjacent its bottom and an outlet opening for air adjacent its top, a series of similarly inclined and spaced plates extending along and over said radiator and means for projecting a finely divided spray into said casing above said plates and transversely thereof.

21. A humidifier structure having in combination, a radiator, a plurality of spaced plates extending over and adjacent the top of said radiator and heated thereby, a casing enclosing said radiator having an inlet opening for air below said radiator, an outlet opening for air above said radiator and forming a chamber above said radiator and means for delivering a fine spray of liquid into said chamber over said plates.

22. A humidifier structure having in combination, a radiator, a plurality of spaced plates having parts disposed over and adjacent the top of said radiator, a casing enclosing said radiator having an inlet opening for air below said radiator, an outlet opening for air above said radiator and forming a chamber above said radiator, means for delivering a fine spray of liquid into said chamber over said plates, said plates being constructed and arranged for the passage of air therebetween as it passes from said inlet to said outlet opening.

23. An apparatus of the class described having in combination, a casing, a radiator enclosed by said casing, an evaporating device extending above and over said radiator to be heated thereby having a liquid receiving surface, means for directing a fine mist above said surface, an air inlet opening for said casing below said radiator and an outlet opening for said casing above said evaporating device whereby air will pass through said casing over said evaporating device and through said spray and out at said outlet opening.

24. A humidifying device having in combination, a casing, a heating means in said casing, a series of members having spaced surfaces vertically alined with said heating means and heated thereby, said casing having an outlet opening for air adjacent its top and having an inlet opening for air below said outlet opening and heating means, means for delivering a spray of finely divided liquid into said casing and means for causing air to move through said casing from said inlet to said outlet opening and through said spray.

25. An apparatus of the class described having in combination, a casing, a radiator in said casing, an evaporating means with parts thereof disposed over said radiator, said casing having a chamber therein above said radiator, means for projecting a finely divided spray of liquid into said chamber, liquid supply means for said last mentioned means, two control means for controlling said liquid supply means, and humidity actuated means for controlling one of said control means, the other of said control means being governed by the temperature of the liquid to be projected.

GOTTLIEB R. MAGNEY.